United States Patent [19]

Henk et al.

[11] Patent Number: 5,498,700
[45] Date of Patent: Mar. 12, 1996

[54] NAPHTHYLAZONAPHTHOL DYES WHICH CONTAIN A 5-CHLORO-6-FLUOROPYRIMIDIN-4-YL REACTIVE GROUP

[75] Inventors: Hermann Henk, Köln; Wilfried Hansmann, Leverkusen, both of Germany

[73] Assignee: Bayer Aktiengesellschaft, Leverkusen, Germany

[21] Appl. No.: 299,723

[22] Filed: Sep. 1, 1994

[30] Foreign Application Priority Data

Sep. 8, 1993 [DE] Germany .................. 43 30 376.5

[51] Int. Cl.⁶ .................. C09B 62/245; D06P 1/382
[52] U.S. Cl. .................. 534/638; 534/582; 534/598; 534/632
[58] Field of Search .................. 534/638

[56] References Cited

U.S. PATENT DOCUMENTS 4,007,164  2/1977  Bien et al. .................. 534/638 X

FOREIGN PATENT DOCUMENTS 0041922  12/1981  European Pat. Off. .
1165661  10/1969  United Kingdom .

*Primary Examiner*—Joseph K. McKane
*Assistant Examiner*—Fiona T. Powers
*Attorney, Agent, or Firm*—William C. Gerstenzang; Sprung Horn Kramer & Woods

[57] ABSTRACT

Reactive dyestuffs of the formula

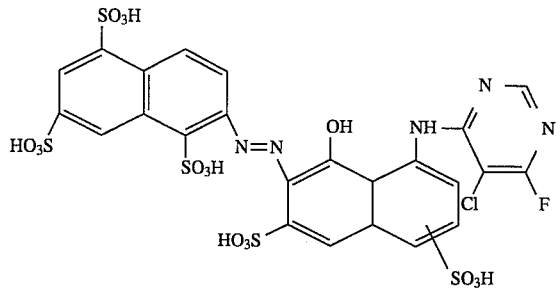

produce bluish red dyes having excellent fastness properties on hydroxyl- and amido-containing fibre material.

6 Claims, No Drawings

NAPHTHYLAZONAPHTHOL DYES WHICH CONTAIN A 5-CHLORO-6-FLUOROPYRIMIDIN-4-YL REACTIVE GROUP

The invention relates to novel reactive dyestuffs, their preparation and use.

Reactive dyestuffs based on azo chromophores which contain a substituted pyrimidine as the reactive group are known, for example from DE-A-1,644,203 and U.S. Pat. No. 4,007,164. Some of the known reactive dyestuffs still have disadvantages in practical application associated with them.

The present invention relates to reactive dyestuffs of the formula

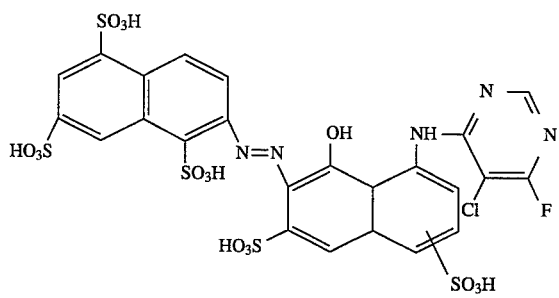

and salts thereof, in particular alkali metal salts or ammonium salts.

Formula (I) shows the sulfo-containing dyestuffs in the form of the free acids.

Dyestuffs I are prepared, for example, by the following methods:

1. By condensation of a reactive component of the general formula

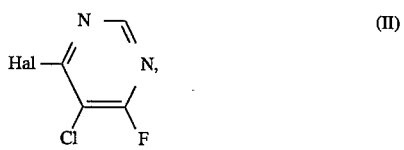

in which

Hal represents chlorine or fluorine, with an aminoazo dyestuff of the general formula

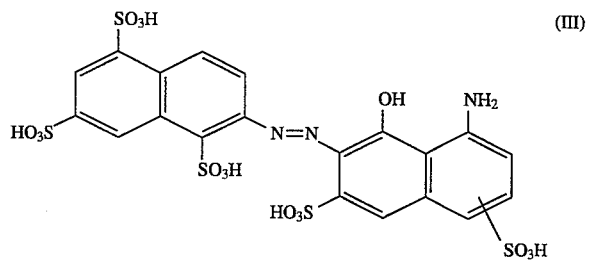

or

2. By azo coupling of a condensation product of the formula

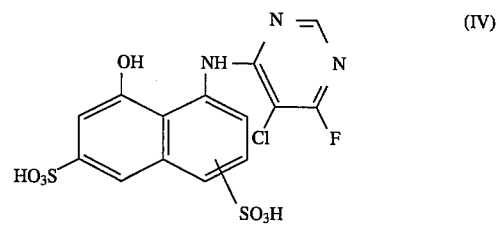

onto a diazonium compound obtained from the amine of the general formula (V) via the usual manner

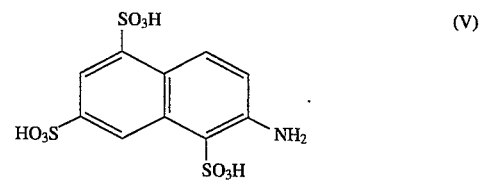

Reactive components of the general formula (II), for example 4,6-difluoro-5-chloropyrimidine or 4,5-dichloro-6-fluoropyrimidine are known and can be obtained, for example from 4,5,6-trichloropyrimidine by fluoride exchange with HF or alkali metal fluorides in aprotic solvents.

Condensation with the aminoazo dyestuffs of the formula (III) is preferably carried out in aqueous solution or suspension in a pH range from 4–12. The hydrogen halide released is neutralized by addition of aqueous alkali, in particular lithium hydroxides, lithium carbonates or lithium bicarbonates.

The aminoazo dyestuffs of the general formula (III) can be obtained in the usual manner by azo coupling of diazonium compounds obtained from the amino of the general formula (V) onto compounds of the formula (VI), the conditions being selected in such a manner that coupling takes place in the o position relative to the OH group of the coupling component (VI)

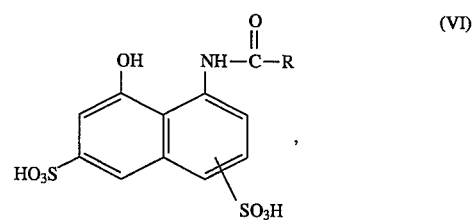

in which

R represents a substituted or unsubstituted aliphatic or aromatic radical.

Following coupling, the acyl radical —COR in (VI) is cleaved off by heating in acidic or alkaline medium.

Suitable acyl radicals are in particular formyl, acetyl, maleonyl, carbamoyl or phthaloyl.

The novel dyestuffs are suitable for dyeing and printing, in particular, hydroxyl- and amido-containing materials, such as textile fibres, textile threads and textile fabrics made of wool, silk, and especially for dyeing and printing native or regenerated cellulose, the treatment of cellulose material being advantageously carried out in the presence of acid-binding agents and, if necessary, by application of heat using the methods disclosed for reactive dyestuffs.

EXAMPLE 1

Sodium hydroxide solution is added to 31.9 g of 1-amino-8-hydroxynaphthalene-3,6-disulfonic acid in 175 ml of water. After cooling to 10° C., 15.1 g of 4,6-difluoro-5- chloropyrimidine are slowly added dropwise to the solution while maintaining the pH at 8.5 to 9.0. This gives a solution of the acylation product of the formula

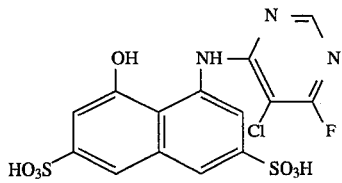

which is used in this form directly for coupling.

The diazonium salt solution obtained in the usual manner from 38.3 g of 2-aminonaphthalene-1,5,7-trisulfonic acid in dilute hydrochloric acid is stirred into the coupling solution thus obtained while cooling with ice. The pH is maintained at 7.0 to 7.5 by addition of sodium carbonate. The dyestuff is salted out, filtered off with suction and dried. The dyestuff is then present as a brown-red powder and dyes cotton in bluish red hues. In the form of the acid, it has the following constitution:

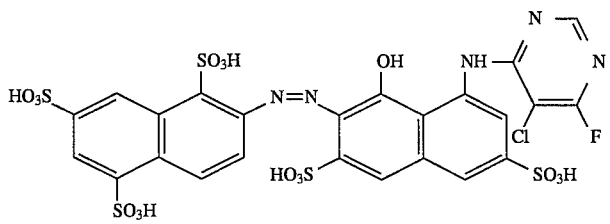

EXAMPLE 2

71.3 g of the aminoazo dyestuff of the formula

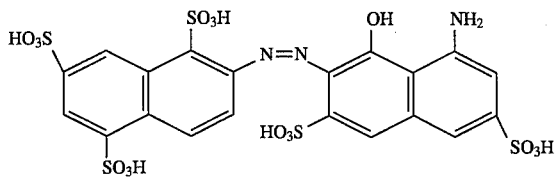

are dissolved in 350 ml of water at 60° C. by means of sodium hydroxide solution. 16.9 g (0.11 mol) of 4,6-difluoro- 5-chloropyrimidine are added to the solution thus obtained at 60° C. while maintaining the pH between 5.5 and 6.0. After about 3 hours, condensation is complete. After addition of 250 ml of water, the dyestuff is salted out, filtered off with suction and dried to give a product which is present as a red-brown powder, dissolves in water giving a deep red solution and dyes cotton in bluish red hues.

In the form of the free acid, it has the following constitution:

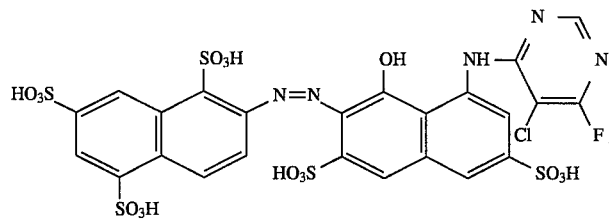

$\lambda_{max}$ 537 nm

EXAMPLE 3

31.9 g of 1-amino-8-hydroxynaphthalene-4,6-disulfonic acid are dissolved in 175 ml of water by means of sodium hydroxide solution. After cooling to 10° C., 15.1 g of 4,6-difluoro- 5-chloropyrimidine are slowly added dropwise to the solution while maintaining the p at 9.5 with sodium hydroxide solution. This gives a solution of the acylation product of the formula

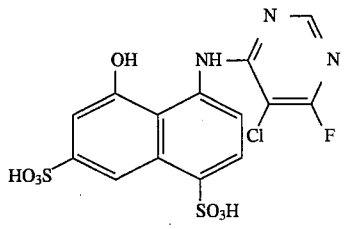

which is used in this manner directly for coupling.

The diazonium salt solution obtained in the usual manner from 38.3 g of 2-aminonaphthalene-1,5,7-trisulfonic acid in dilute hydrochloric acid is stirred into the coupling solution thus obtained while cooling with ice. The pH is maintained at 7.0 to 7.5 by addition of sodium carbonate. After stirring for 1 more hour, the dyestuff is salted out, filtered off with suction and dried. The dyestuff is then present as a brown-red powder and dyes cotton in red hues. In the form of the free acid, it has the following constitution:

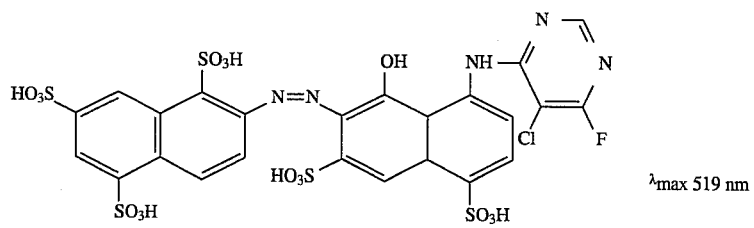

$\lambda_{max}$ 519 nm

EXAMPLE 4

71.3 g of the aminoazo dyestuff of the formula

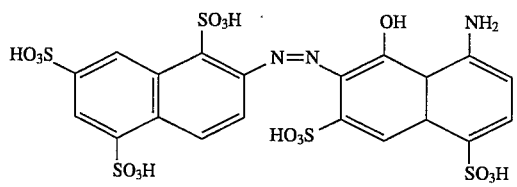

are dissolved in 350 ml of water at 60° C. by means of sodium hydroxide solution. 16.6 g (0.11 mol) of 4,6-difluoro-5-chloropyrimidine are added at 60° C. to the solution thus obtained while maintaining the pH between 5.5 and 6.0 with sodium carbonate solution. After about 3 hours, condensation is complete. After addition of 250 ml of water, the dyestuff is salted out, filtered off with suction and dried to give a product which is present as a red-brown powder, dissolves in water giving a deep red solution and dyes cotton in red hues.

In the form of the free acid, it has the following constitution:

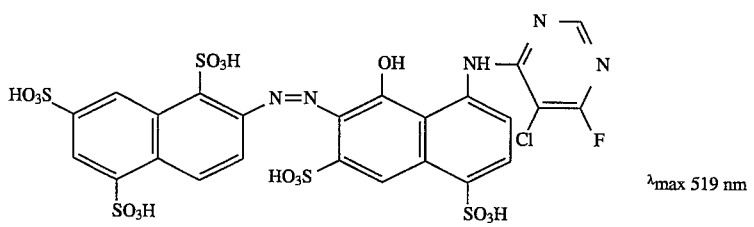

$\lambda_{max}$ 519 nm

We claim:

1. Reactive dyestuff which, in the form of the free acid, has the following formula

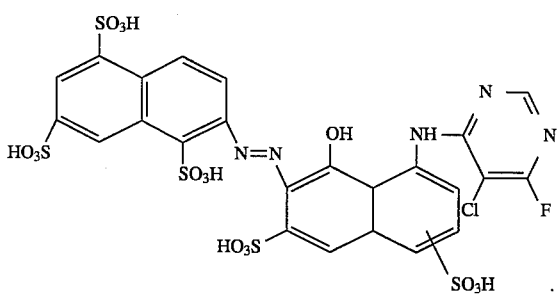

(I)

2. Reactive dyestuff according to claim 1 of the following formula

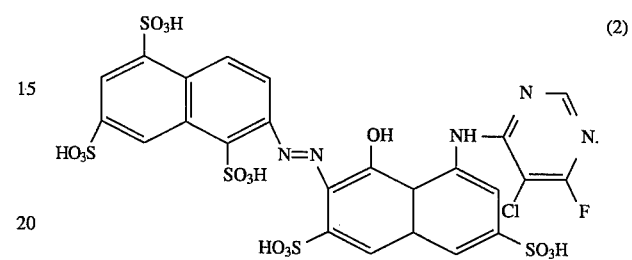

(2)

3. Reactive dyestuff according to claim 1 of the following formula

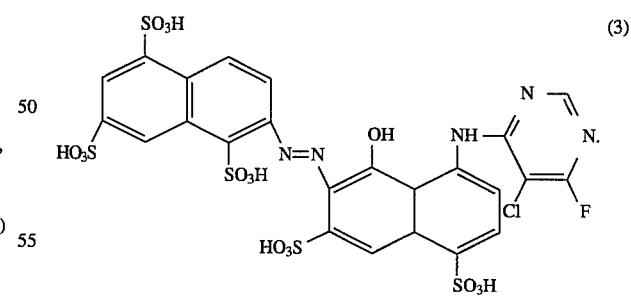

(3)

4. Process for dyeing and printing fibre materials with a dyestuff, comprising applying there to a dyestuff according to claim 1.

5. Process according to claim 4, wherein the fibre material contains hydroxyl groups and/or amido groups.

6. Fabric based on a hydroxyl- and/or amido-containing material, wherein the material has been dyed or printed with a dyestuff according to claim 1.

* * * * *